(12) United States Patent
Porwal et al.

(10) Patent No.: US 12,154,042 B2
(45) Date of Patent: Nov. 26, 2024

(54) SYSTEMS FOR ESTIMATING TERMINAL EVENT LIKELIHOOD

(71) Applicant: Adobe Inc., San Jose, CA (US)

(72) Inventors: Vibhor Porwal, Auraiya (IN); Ayush Chauhan, Meerut (IN); Aurghya Maiti, Kolkata (IN); Gaurav Sinha, Bangalore (IN); Ruchi Sandeep Pandya, Saratoga, CA (US)

(73) Assignee: Adobe Inc., San Jose, CA (US)

( * ) Notice: Subject to any disclaimer, the term of this patent is extended or adjusted under 35 U.S.C. 154(b) by 773 days.

(21) Appl. No.: 17/402,788

(22) Filed: Aug. 16, 2021

(65) Prior Publication Data
US 2023/0051416 A1    Feb. 16, 2023

(51) Int. Cl.
*G06N 7/01*       (2023.01)
*G06F 18/214*   (2023.01)
(Continued)

(52) U.S. Cl.
CPC ........... *G06N 7/01* (2023.01); *G06F 18/2155* (2023.01); *G06F 18/2321* (2023.01);
(Continued)

(58) Field of Classification Search
CPC .......... G06N 7/01; G06N 5/046; G06N 20/10; G06N 20/20; G06N 3/10; G06N 3/044;
(Continued)

(56) References Cited

U.S. PATENT DOCUMENTS 10,853,385 B1 * 12/2020 Truong ................... G06N 7/01
11,900,169 B1 *  2/2024 Dhandhania ............ G06F 9/505
(Continued)

FOREIGN PATENT DOCUMENTS

AU    2014346366 A1 *  6/2016    .......... G06F 11/1469
CA       2856157 A1 *  6/2013    .......... H04L 41/0823
(Continued)

OTHER PUBLICATIONS

"BayesiaLab", Bayesia USA [retrieved 2021-25-25]. Retrieved from the Internet <https://www.bayesia.com/>., 2010, 9 Pages.
(Continued)

*Primary Examiner* — Steven P Sax
(74) *Attorney, Agent, or Firm* — FIG. 1 Patents

(57) ABSTRACT

In implementations of systems for estimating terminal event likelihood, a computing device implements a termination system to receive observed data describing values of a treatment metric and indications of a terminal event. Values of the treatment metric are grouped into groups using a mixture model that represents the treatment metric as a mixture of distributions. Parameters of a distribution are estimated for each of the groups and mixing proportions are also estimated for each of the groups. In response to receiving a user input requesting an estimate of a likelihood of the terminal event for a particular value of the treatment metric, the termination system generates an indication of the estimate of the likelihood of the terminal event for the particular value based on a distribution density at the particular value for each of the groups and a probability of including the particular value in each of the groups.

20 Claims, 13 Drawing Sheets

(51) Int. Cl.
  *G06F 18/2321* (2023.01)
  *G06F 18/23213* (2023.01)
  *G06N 5/046* (2023.01)
  *G06N 20/00* (2019.01)
  *G06F 9/54* (2006.01)

(52) U.S. Cl.
  CPC ....... *G06F 18/23213* (2023.01); *G06N 5/046* (2013.01); *G06N 20/00* (2019.01); *G06F 9/542* (2013.01)

(58) Field of Classification Search
  CPC .. G06F 18/2155; G06F 18/2321; G06F 9/542; G06F 16/9024; H04L 67/53; H04L 43/10
  See application file for complete search history.

(56) References Cited

U.S. PATENT DOCUMENTS

| | | | | |
|---|---|---|---|---|
| 2014/0068368 | A1* | 3/2014 | Zhang | H03M 13/658 714/752 |
| 2015/0288557 | A1* | 10/2015 | Gates | G06F 11/0709 714/37 |
| 2015/0288558 | A1* | 10/2015 | Gates | G06F 11/079 714/57 |
| 2016/0337226 | A1* | 11/2016 | Padala | H04L 67/53 |
| 2020/0211035 | A1* | 7/2020 | Bluming | G06Q 10/0635 |
| 2021/0404819 | A1* | 12/2021 | Chang | G01C 21/3661 |
| 2022/0075793 | A1* | 3/2022 | Jezewski | G06N 5/04 |

FOREIGN PATENT DOCUMENTS

| | | | | |
|---|---|---|---|---|
| CA | 3053531 A1 | * | 8/2018 | ....... G06F 16/24578 |
| CA | 3101803 A1 | * | 12/2019 | ........... G06F 16/221 |
| CA | 3141042 A1 | * | 12/2020 | ............. H04L 12/46 |
| CA | 2929777 C | * | 10/2021 | ....... G06F 16/24568 |
| CA | 3183228 A1 | * | 12/2021 | .......... G06F 40/123 |
| CN | 101707559 A | * | 5/2010 | |
| CN | 111338972 A | * | 6/2020 | .......... G06F 11/3604 |
| EP | 2889822 A1 | * | 7/2015 | ....... G06F 17/30598 |
| KR | 20180095912 A | * | 8/2018 | |
| TW | 200913509 A | * | 3/2009 | ........ H03M 13/1117 |

OTHER PUBLICATIONS

Bishop, Christopher M. et al., "Pattern Recognition and Machine Learning", Springer-Verlag New York, Springer Science+Business Media, LLC [retrieved Jun. 9, 2021]. Retrieved from the Internet <https://www.microsoft.com/en-us/research/uploads/prod/2006/01/Bishop-Pattern-Recognition-and-Machine-Learning-2006.pdf>., Jan. 2006, 758 pages.

Conrady, Stefan et al., "Bayesian Networks and BayesiaLab: A Practical Introduction for Researchers", Bayesia USA [retrieved Jun. 9, 2021]. Retrieved from the internet <https://www.researchgate.net/publication/282362899_Bayesian_Networks_BayesiaLab_-_A_Practical_Introduction_for_Researchers>., Sep. 2015, 383 pages.

Fisher, R. A. , "The Design of Experiments", Oliver and Boyd, Edinburgh [retrieved Jun. 9, 2021][Retrieved from the Internet <http://tankona.free.fr/fisher1935.pdf>., 1935, 257 pages.

Henrion, Max , "Propagating Uncertainty in Bayesian Networks by Probabilistic Logic Sampling", Uncertainty in Artificial Intelligence 2, , edited by J. F. Lemmer and L. N. Kanal, Elsevier Science Publishers B.V. [retrieved Jun. 9, 2021]. Retrieved from the Internet <https://doi.org/10.1016/B978-0-444-70396-5.50019-4>., 1988, 15 pages.

Malinsky, Daniel et al., "Causal discovery algorithms: A practical guide", Philosophy Compass, vol. 13, No. 1 [retrieved Jun. 25, 2021]. Retrieved from the Internet <http://www.dmalinsky.com/uploads/4/9/9/3/49933045/philcomp18_published.pdf>., Nov. 23, 2017, 11 Pages.

Pearl, Judea , "Causality: Models, Reasoning, and Inference", Cambridge University Press, New York, NY [retrieved Jul. 15, 2021]. Retrieved from the Internet <https://doi.org/10.1017/CBO9780511803161>., Sep. 14, 2009, 487 pages.

Ramsey, Joseph et al., "A million variables and more: the Fast Greedy Equivalence Search algorithm for learning high-dimensional graphical causal models, with an application to functional magnetic resonance images", International Journal of Data Science and Analytics, vol. 3, No. 2 [retrieved Jun. 25, 2021]. Retrieved from the Internet <https://link.springer.com/content/pdf/10.1007/s41060-016-0032-z.pdf>., Dec. 1, 2016, 9 Pages.

Shimizu, Shohei et al., "A Linear Non-Gaussian Acyclic Model for Causal Discovery", The Journal of Machine Learning Research, vol. 7, No. 72 [retrieved Jun. 25, 2021]. Retrieved from the Internet <https://www.jmlr.org/papers/volume7/shimizu06a/shimizu06a.pdf>., Oct. 2006, 28 Pages.

Spirtes, Peter , "Introduction to Causal Inference", Journal of Machine Learning Research, vol. 11, No. 54 [retrieved Jun. 9, 2021]. Retrieved from the Internet <https://www.jmlr.org/papers/volume11/spirtes10a/spirtes10a.pdf>., May 2010.

Stone, Richard , "The Assumptions on Which Causal Inferences Rest", Journal of the Royal Statistical Society. Series B (Methodological) vol. 55, No. 2 [retrieved Jul. 15, 2021]. Retrieved from the Internet <https://www.jstor.org/stable/2346206>., 1993, 12 pages.

Zheng, Xun et al., "DAGs with No Tears: continuous optimization for structure learning", NIPS'18: Proceedings of the 32nd International Conference on Neural Information Processing Systems [retrieved Jun. 25, 2021]. Retrieved from the Internet <https://proceedings.neurips.cc/paper/2018/file/e347c51419ffb23ca3fd5050202f9c3d-Paper.pdf>., Dec. 2018, 12 Pages.

* cited by examiner

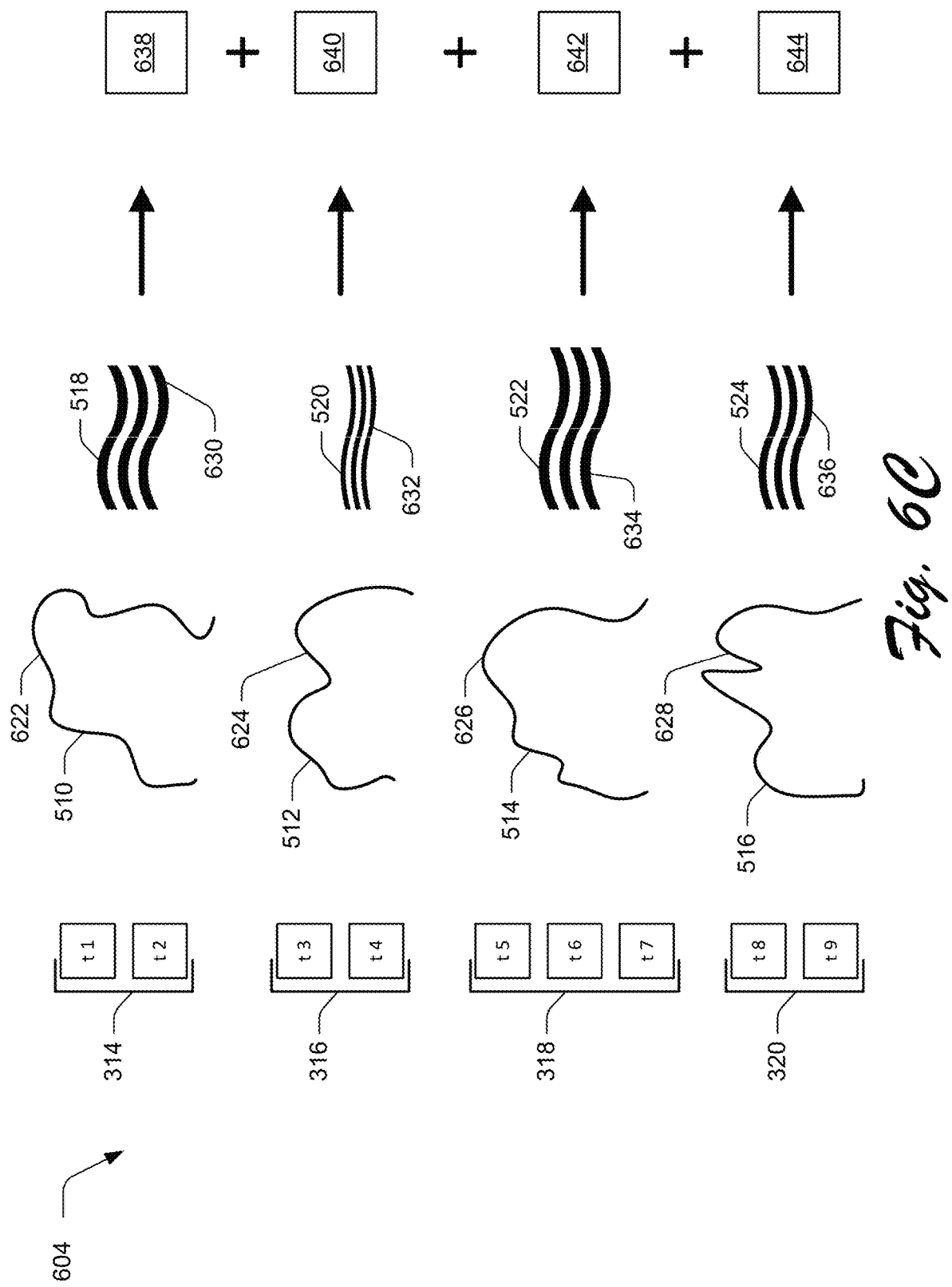

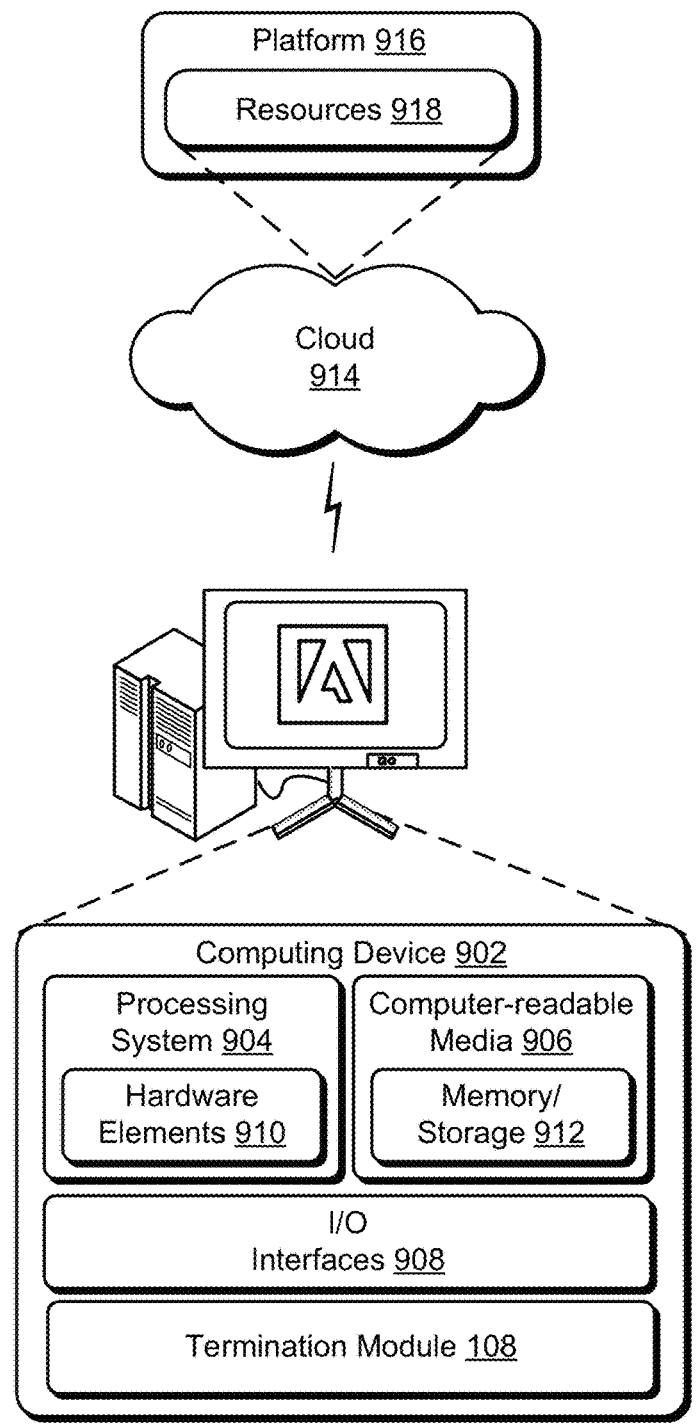

SYSTEMS FOR ESTIMATING TERMINAL EVENT LIKELIHOOD

BACKGROUND

The "curse of dimensionality" is a significant challenge faced by computing devices that prevents processing systems of the computing devices from accurately processing input data describing relatively large numbers of dimensions or values. These processing inaccuracies are indirectly observable in results output by the computing devices which are also inaccurate. The inaccurate results caused by this technical challenge are frequently observable because many practical applications involve high cardinality input data. In one such example, it is not possible for a computing device to accurately compute estimates of a causal effect of a treatment metric on an outcome if the treatment metric has a number of values that is greater than a threshold number. This is because some of the values have a very low probability of occurrence, and conditional probabilities computed by processing systems of the computing device using these values are not accurate.

In order to overcome such accuracy limitations when faced with treatment metric data describing a number of values that is greater than the threshold, the computing device clusters the values of the treatment metric into a number of bins that is less than the threshold. For example, a processing system of the computing device is implemented to cluster 10,000 values into 10 bins such that each of the 10,000 values is included in one of the 10 bins. The computing device then processes the bins of values as input data to compute the estimates of the causal effect (e.g., 10 estimates instead of 10,000). However, once the computing device has clustered values of the treatment metric into the bins, conventional systems are not capable of accurately computing a causal effect on the outcome for any of the particular values that are included in the bins. Rather, conventional computing systems are limited to accurately computing one causal effect on the outcome for each bin of the values which is a shortcoming of these systems.

SUMMARY

Techniques and systems are described to improve operation of computing devices such that accurate computations are possible for all values described by input data even when a number of these values is large enough to cause "the curse of dimensionality" using conventional systems. In an example, a computing device implements a termination system to receive observed data describing values of a treatment metric, values of a covariate metric, and indications of a terminal event. A processing system of the computing device groups the values of the treatment metric into groups using a mixture model that represents the treatment metric as a mixture of distributions.

For example, the processing system of the computing device computes parameters of a distribution and a mixing proportion for each of the groups using an expectation-maximization algorithm. The termination system forms a directed acyclic graph, automatically and without user intervention, having a node for the treatment metric, a node for the covariate metric, and a node for the terminal event. In one example, the termination system receives a user input requesting an estimate of a likelihood of the terminal event for a particular value of the treatment metric.

In response to receiving the user input, the termination system implements the processing system to compute a distribution density at the particular value for each of the groups using the directed acyclic graph and the estimated parameters of the distribution for each of the groups. The processing system also computes a probability of including the particular value in each of the groups using the directed acyclic graph and the estimated mixing proportion for each of the groups. The termination system generates an indication of the estimate of the likelihood of the terminal event for display in a user interface based on the distribution density at the particular value for each of the groups and the probability of including the particular value in each of the groups.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 6A, 6B, 6C, and 6D illustrate examples of estimating terminal event likelihood.

FIG. 9 illustrates an example system that includes an example computing device that is representative of one or more computing systems and/or devices for implementing the various techniques described herein.

DETAILED DESCRIPTION

Overview

Figure 1:
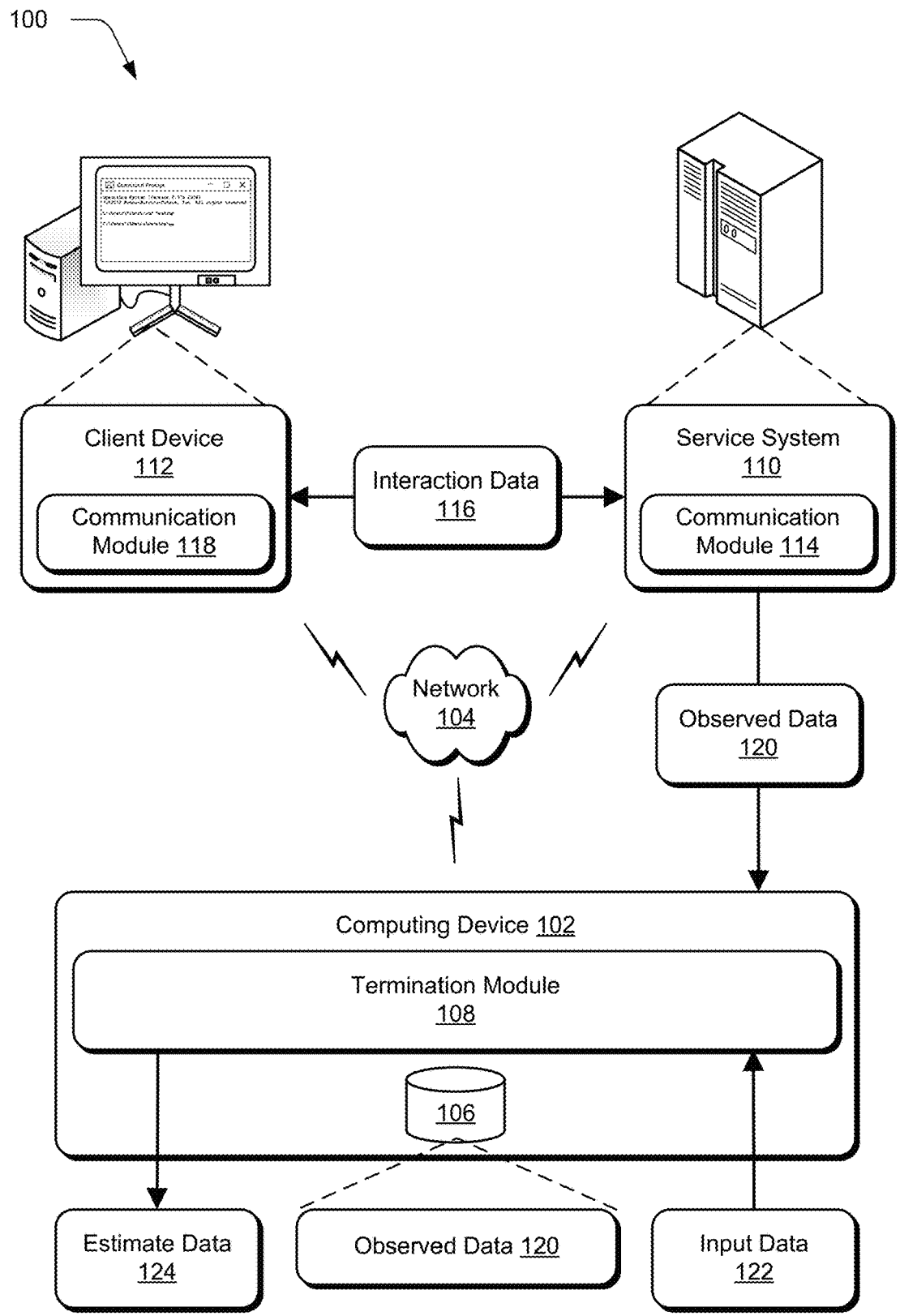
FIG. 1 is an illustration of an environment in an example implementation that is operable to employ digital systems and techniques for estimating terminal event likelihood as described herein.

Processing systems of computing devices are not able to accurately process input data in scenarios in which the input data describes relatively large numbers of values or dimensions due to the "curse of dimensionality." In an example, the curse of dimensionality prevents a computing device from accurately computing estimates of a causal effect of a treatment metric on an outcome if the treatment metric has a number of values that is greater than a threshold number. To overcome this, a processor system of the computing device clusters the values of the treatment metric into a number of bins which is less than the threshold number. The computing device then implements the processor system to estimate causal effects for the bins of values, for example, using a causal discovery algorithm.

By estimating causal effects for the bins of values instead of the values, the computing device reduces a number of dimensions or values described by input data to avoid the curse of dimensionality. However, once the original values of the treatment metric are clustered into the bins, it is not possible for the computing device to accurately estimate causal effects for the original values. Instead, computing devices of conventional systems are limited to accurately estimating a single causal effect for each of the bins. This is a shortcoming of conventional systems and techniques.

In order to overcome the limitations of conventional systems such that it is possible to accurately estimate causal effects for every treatment metric value described by high cardinality input data, techniques and systems are described for estimating terminal event likelihood. In an example, a computing device implements a termination system to receive observed data describing values of a treatment metric, values of a covariate metric, and indications of a terminal event. For instance, the termination system determines that a number of the values of the treatment metric is greater than a threshold number k. In response to this determination, the termination system implements a processor system of the computing device to group the values of the treatment metric into groups using a mixture model such that a number of the groups is less than the threshold number k.

The mixture model represents the treatment metric as a mixture of distributions. Instead of only using the groups of values to avoid the "curse of dimensionality" as in conventional systems, the termination system estimates parameters of a distribution of the mixture of distributions for each of the groups using an expectation-maximization algorithm. The termination system also estimates a mixing proportion for each of the groups using the expectation-maximization algorithm. The estimated distribution parameters and mixing proportions for each of the groups are usable to estimate a terminal event likelihood for each of the values of the treatment metric included in each of the groups.

To do so in one example, the termination system forms a directed acyclic graph, automatically and without user intervention, using a causal discovery algorithm and the groups of the treatment metric values. For example, the termination system forms the directed acyclic graph using the Fast Greedy Equivalence Search algorithm. The directed acyclic graph includes a node for the treatment metric, a node for the covariate metric, and a node for the terminal event.

In response to receiving a user input requesting an estimate of a likelihood of the terminal event for a particular value of the treatment metric, the termination system implements the processor system to compute a distribution density at the particular value for each of the groups using a structure of the directed acyclic graph and the estimated parameters of the distribution for each of the groups. The processor system of the computing device also computes a probability of including the particular value in each of the groups using the structure of the directed acyclic graph and the estimated mixing proportion for each of the groups. Next, the termination system computes an estimate component for each of the groups as a product of the distribution density at the particular value and the probability of including the particular value in the group.

Unlike conventional systems that are limited to estimating a causal effect for one group that contains the particular value, the termination system computes one estimate component for each of the groups using the particular value. Each of these estimate components represents a portion of a causal effect for the particular value which is lost and not recovered using conventional techniques. The termination system sums or combines the estimate components as the estimate of the likelihood of the terminal event for the particular value of the treatment metric. This estimate of the likelihood of the terminal event for the particular value is accurate and termination system is capable of accurately estimating a likelihood of the terminal event for any value of the treatment metric which is not possible using conventional systems.

By estimating the likelihood of the terminal event using probabilities of including the particular value in each of the groups rather than using only the one group that includes the particular value, the described systems are capable of accurately estimating causal effects for all of the values of the treatment metric even if a number of the values is greater than the threshold number k. Moreover, the described systems also estimate likelihoods of terminal events with increased accuracy relative to conventional systems. This technological improvement is verified using a real-world dataset and then validated using a synthetic dataset.

Term Examples

As used herein, the term "terminal event" refers to an event defining or occurring at an end of a lifecycle, a series, a relationship, and so forth. Examples of a terminal event for a computing device include a failure of the computing device, a retirement of the computing device, a replacement of the computing device, etc. Further examples of terminal events include a cancelation of a service or a membership or a loss of a connection to a network.

As used herein, the term "metric" refers to a variable having values expected to influence an occurrence or a non-occurrence of a terminal event.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The computing device 102 includes a storage device 106 and a termination module 108. For example, the storage device 106 is accessible to the termination module 108, and the termination module 108 is capable of transmitting and/or receiving data via the network 104. The illustrated environment 100 also includes a service system 110 and a client device 112 which are also connected to the network 104. Although the service system 110 is illustrated as a single service system 110, it is to be appreciated that in some examples the service system 110 is representative of multiple service systems 110. For example, the client device 112 is representative of multiple client devices 112.

The service system 110 includes a communication module 114 and the service system 110 implements the communication module 114 to transmit and/or receive data, e.g., via the network 104. Data transmitted and/or received by the service system 110 is illustrated as interaction data 116. For instance, the client device 112 is illustrated to include a communication module 118 which the client device 112 implements to transmit and/or receive the interaction data 116 via the network 104.

In one example, the service system 110 provides computing resources such as storage capacity and/or processing resources for the client device 112 and other client devices 112. In this example, the interaction data 116 describes interactions between the client device 112 and the service system 110 as part of the client device's 112 use of blocks of storage capacity made available to the client device 112 by the service system 110. For example, the interaction data 116 describes blocks of storage capacity requested for use by the client device 112, blocks of storage capacity made available by the service system 110 for use by the client device 112, an amount of the service system's 110 storage capacity currently being used by the client device 112, and so forth.

The service system 110 generates observed data 120 based on the interaction data 116, and the observed data 120 describes values of metrics and indications of terminal events. For example, the amount of the service system's 110 storage capacity currently being used by the client device 112 is a metric and this metric has values that are numbers of blocks of storage capacity. Consider an example in which the observed data 120 describes the client device 112 using eight blocks of storage capacity on a first day, nine blocks of storage capacity on a second day, and eight blocks of storage capacity on a third day.

In this example, a terminal event is characterized by a discontinued use of a block of storage capacity which was used by the client device 112 previously. Accordingly, the terminal event occurred on the third day when the client device 112 only used the eight blocks of storage capacity instead of the nine blocks of storage capacity that the client device 112 used on the second day. Thus, the server system 110 generates the observed data 120 as describing no indications of the terminal event on the first day and the second day and an indication of the terminal event on the third day.

The service system 110 transmits the observed data 120 to the computing device 102 via the network 104. The computing device 102 implements the termination module 108 to receive the observed data 120 which is illustrated as being stored on the storage device 106. Consider an example in which the observed data 120 describes values of a treatment metric, values of a covariate metric, and indications of a terminal event. The amount of the service system's 110 storage capacity currently being used by the client device 112 is the treatment metric and the terminal event is the discontinued use of a block of storage capacity which was used by the client device 112 previously.

In this example, example, the values of the treatment metric are eight blocks of storage capacity on the first day, nine blocks of storage capacity on the second day, eight blocks of storage capacity on the third day, and nine blocks of storage capacity for a next 97 days. A cardinality of the treatment metric is relatively high in this example (e.g., 100 possible values) compared to a cardinality of the treatment metric in the previous example (e.g., three possible values). Continuing this example, the covariate metric is an average amount of the service system's 110 storage capacity currently being used by a group of client devices 112. The values of the covariate metric are 4.5 blocks of storage capacity on the first day, 5.7 blocks of storage capacity on the second day, 4.4 blocks of storage capacity on the third day, and 5.5 blocks of storage capacity for the next 97 days.

The termination module 108 groups the values of the treatment metric into groups using a mixture model and also groups the values of the covariate metric into additional groups using an additional mixture model. To do so in one example, the termination module 108 uses the mixture model to model distributions over a range of the values of the treatment metric such that each of the distributions corresponds to one of the groups. In order to learn parameters of the distributions as well as mixing proportions, the termination module 108 leverages, e.g., an expectation-maximization algorithm.

In an example, the termination module 108 clusters the values of the treatment metric into the groups using k-means clustering which ensures that a number of the groups is smaller than a number of the values of the treatment metric. In a first example, the values of the treatment metric are uniformly grouped into the groups such that each of the groups includes a same number of the values. In a second example, the values of the treatment metric are not uniformly grouped into the groups such that a first group of the groups includes a different number of the values of the treatment metric than a number of the values of the treatment metric included in a second group of the groups.

After grouping the values of the treatment metric into the groups and the values of the covariate metric into the additional groups, the termination module 108 forms a directed acyclic graph that has a node for the treatment metric, a node for the covariate metric, and a node for the terminal event. If a structure of a causal Bayesian network for the observed data 120 is known, then the termination module 108 forms the directed acyclic graph as having the structure of the causal Bayesian network. If the structure of the causal Bayesian network for the observed data 120 is not known, then the termination module 108 forms the directed acyclic graph using a Fast Greedy Equivalence Search algorithm. The termination module 108 then uses the directed acyclic graph to estimate conditional probabilities for nodes of the directed acyclic graph. These conditional probabilities represent distributions of a node given values of the node's parents.

As shown in FIG. 1, the termination module 108 receives input data 122 describing a user input requesting an estimate of a likelihood of the terminal event for a particular value of the values of the treatment metric. The termination module 108 uses the directed acyclic graph, the distributions associated with each of the groups, and probabilities of including the particular value in each of the groups to generate estimate data 124. The estimate data 124 describes an indication of the estimate of the likelihood of the terminal event for the particular value.

The termination module 108 breaks edges of the directed acyclic graph that are incoming edges of the node for the treatment metric and sets a value of the treatment metric equal to the particular value indicated in the user input. The termination module then performs probabilistic logic sampling, e.g., to estimate a required probability. In order to generate the estimate data 124, the termination module 108 computes products of the probabilities of including the value in each of the groups and densities of the distributions associated with each of the groups at that particular value of the treatment metric.

For instance, the termination module 108 computes an estimate component for each of the groups as a product of the distribution density at the particular value and the probability of including the particular value in each of the groups. The termination module 108 then sums or combines the estimate components for each of the groups to determine the estimate of the likelihood of the terminal event for the particular value. By computing an estimate component for each of the groups in this way, the termination module 108 leverages each of the groups to determine the estimate of the likelihood of the terminal event. This is in contrast to conventional techniques which only leverage a particular one of the groups that contains the particular value to determine the estimate of the likelihood of the terminal event. By determining the estimate of the likelihood of the terminal event based on the probabilities of including the particular value in each of the groups rather than solely based on the particular one of the groups that includes the particular value, the termination module 108 improves an accuracy of the estimate. This is possible even though the cardinality of the treatment metric is relatively high in this example.

Figure 2:
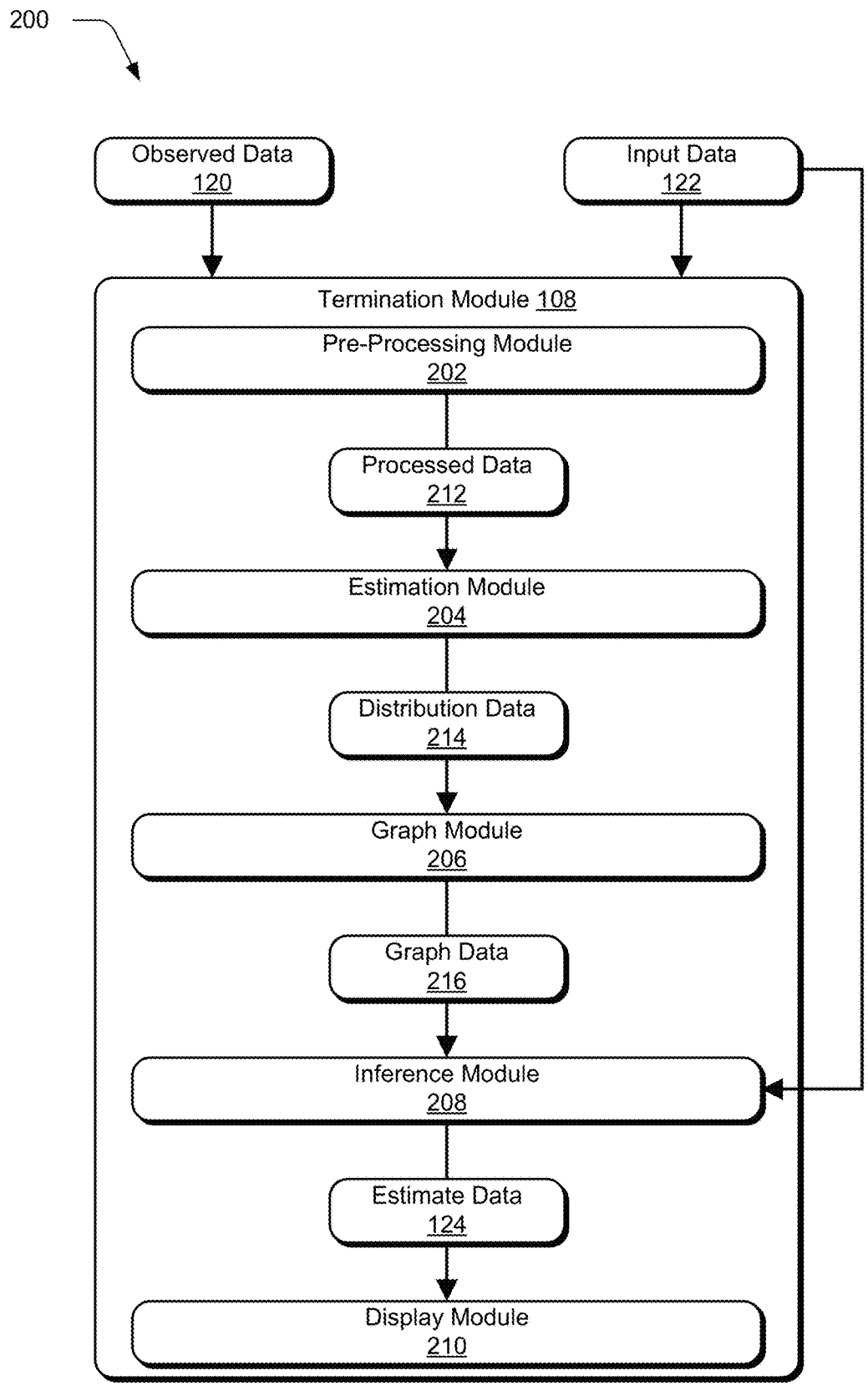
FIG. 2 depicts a system in an example implementation showing operation of a termination module for estimating terminal event likelihood.

FIG. 2 depicts a system 200 in an example implementation showing operation of a termination module 108. The termination module 108 is illustrated to include a pre-processing module 202, an estimation module 204, a graph module 206, an inference module 208, and a display module 210. The pre-processing module 202 receives the observed data 120 and the input data 122, and the pre-processing module 202 processes the observed data 120 to generate processed data 212.

Figure 3A:
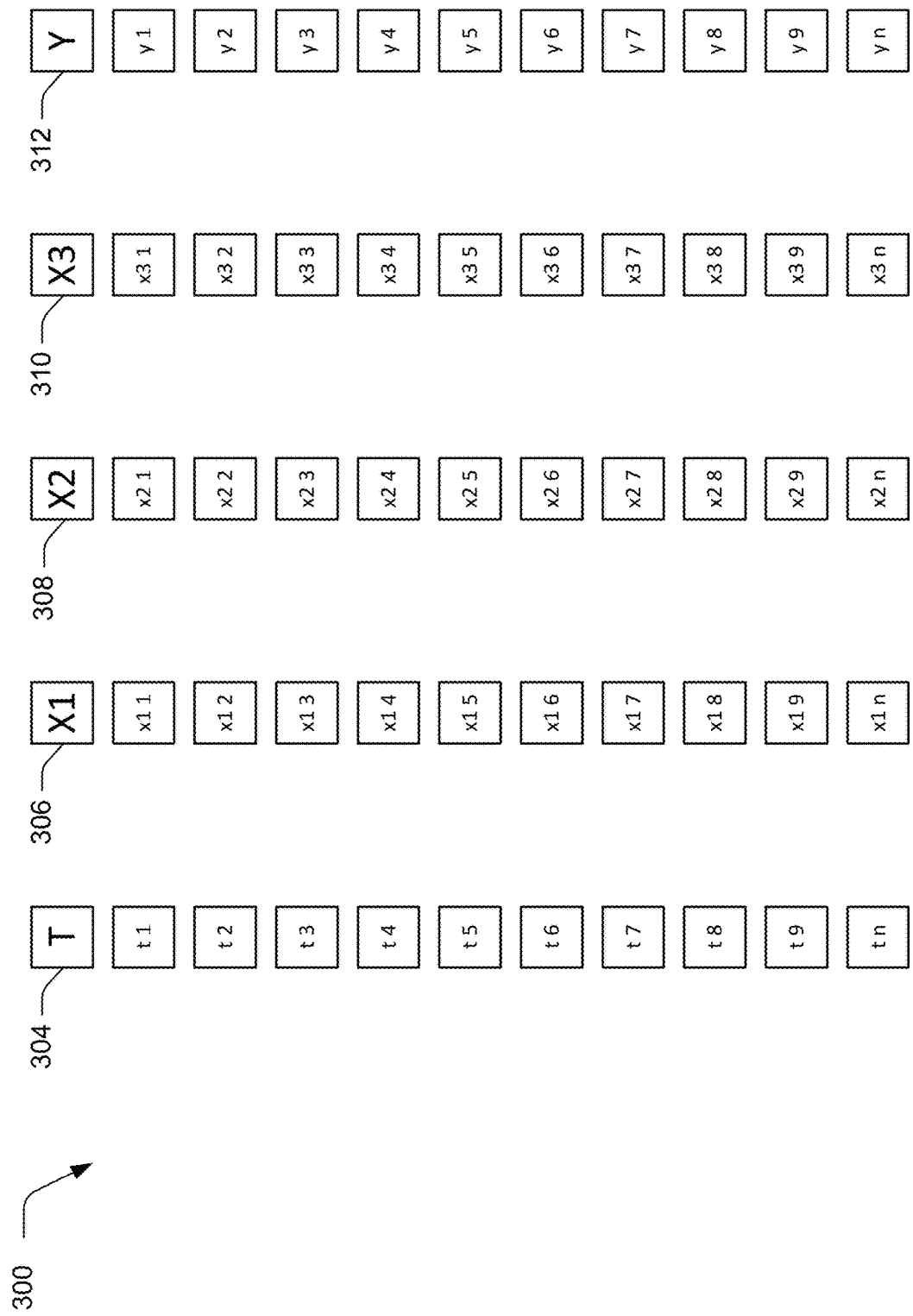
FIGS. 3A and 3B illustrate examples of pre-processing observed data.
Figure 3B:
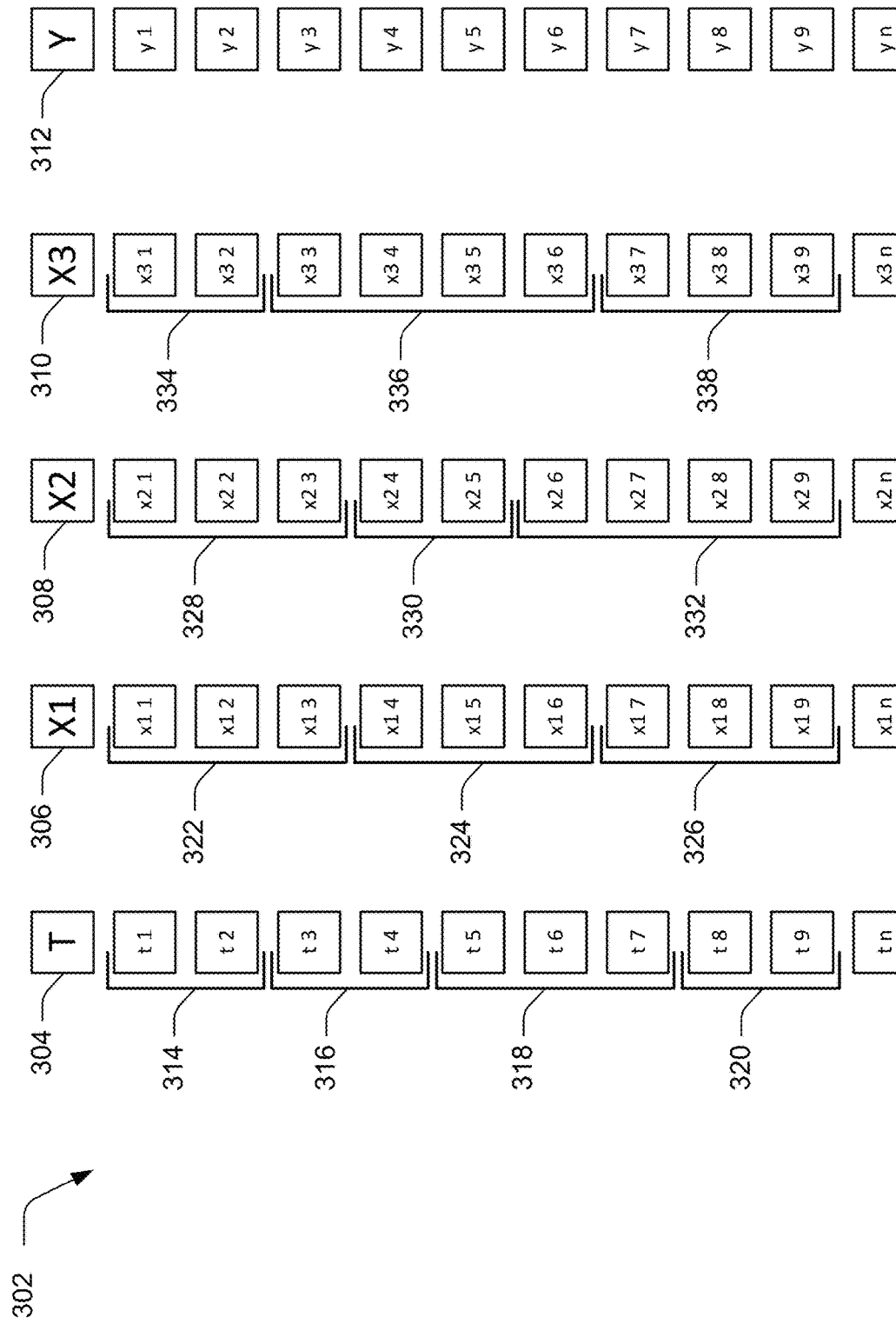

FIGS. 3A and 3B illustrate examples of pre-processing observed data 120. FIG. 3A illustrates a representation 300 of the observed data 120. FIG. 3B illustrates a representation 302 of the processed data 212. With reference to FIG. 2 and FIG. 3A, the pre-processing module 202 receives the observed data 120 which describes values of metrics and indications of a terminal event.

As shown in the representation 300, the observed data 120 describes a treatment metric 304. The treatment metric 304 includes treatment values t1-t9. The observed data 120 also describes a first covariate metric 306, a second covariate metric 308, and a third covariate metric 310. The first covariate metric 306 includes first covariate values x11-x19; the second covariate metric 308 includes second covariate values x21-x29; and the third covariate metric 310 includes third covariate values x31-x39. The observed data 120 further describes a terminal event 312 which includes terminal event indications y1-y9. For example, the treatment metric 304 is a variable of interest and the terminal event 312 is an outcome of interest which is influenceable by values of the first, second, and third covariate metrics 306-310.

Consider an example in which a number of the first covariate values x11-x19 is greater than a threshold k; a number of the second covariate values x21-x29 is greater than the threshold k; and a number of the third covariate values x31-x39 is greater than the threshold k. In this example, the threshold k represents a large enough number to cause inaccuracies associated with the "curse of dimensionality." For instance, some of the first covariate values x11-x19 are associated with a probability of occurrence which is very small and conditional probabilities estimated based on these low probabilities of occurrence are not accurate.

In order to estimate likelihoods of the terminal event 312 for the treatment values t1-t9 of the treatment metric 304, the pre-processing module 202 determines that a number of the treatment values t1-t9 is greater than the threshold k; a number of the first covariate values x11-x19 is greater than the threshold k; a number of the second covariate values x21-x29 is greater than the threshold k; and a number of the third covariate values x31-x39 is greater than the threshold k. In one example, the pre-processing module 202 represents this as:

$$V \in \{T, X1, X2, X3\}$$

where: T represents the treatment metric 304; X1 represents the first covariate metric 306; X2 represents the second covariate metric 308; and X3 represents the third covariate metric 310.

For example, the pre-processing module 202 fits a mixture model for V with k components. The pre-processing module 202 then uses a mixture distribution to map all elements of V to a new column d(V) taking values in $\{1, \ldots, k\}$. As shown in FIG. 3B, the representation 302 includes the treatment values t1-t9 grouped into groups 314-320 such that a number of the groups 314-320 is less than or equal to the threshold k. For example, the pre-processing module 202 performs k-means clustering on the treatment values t1-t9 to cluster the treatment values t1-t9 into the groups 314-320. In this example, each of the groups 314-320 is a cluster formed by performing k-means clustering on the treatment values t1-t9.

For instance, group 314 includes treatment values t1 and t2; group 316 includes treatment values t3 and t4; group 318 includes treatment values t5, t6, and t7; and group 320 includes treatment values t8 and t9. The pre-processing module 202 also performs k-means clustering on the first covariate values x11-x19 to cluster the first covariate values x11-x19 into groups 322-326. Similarly, the pre-processing module 202 performs k-means clustering on the second covariate values x21-x29 to cluster the second covariate values x21-x29 into groups 328-332 and the pre-processing module 202 performs k-means clustering on the third covariate values x31-x39 to cluster the third covariate values x31-x39 into groups 334-338. For example, a number of the groups 322-326 is less than or equal to the threshold k; a number of the groups 328-332 is less than or equal to the threshold k; and a number of the groups 334-338 is less than or equal to the threshold k.

As shown, group 322 includes first covariate values x11, x12, and x13; group 324 includes first covariate values x14, x15, and x16; group 326 includes first covariate values x17, x18, and x19; group 328 includes second covariate values x21, x22, and x23; group 330 includes second covariate values x24 and x25; group 332 includes second covariate values x26, x27, x28, and x29; group 334 includes third covariate values x31 and x32; group 336 includes third covariate values x33, x34, x35, and x36; and group 338 includes third covariate values x37, x38, and x39. For example, the terminal event indications y1-y9 are not grouped into groups. The pre-processing module 202 generates the processed data 212 as describing the representation 302.

Figure 4:
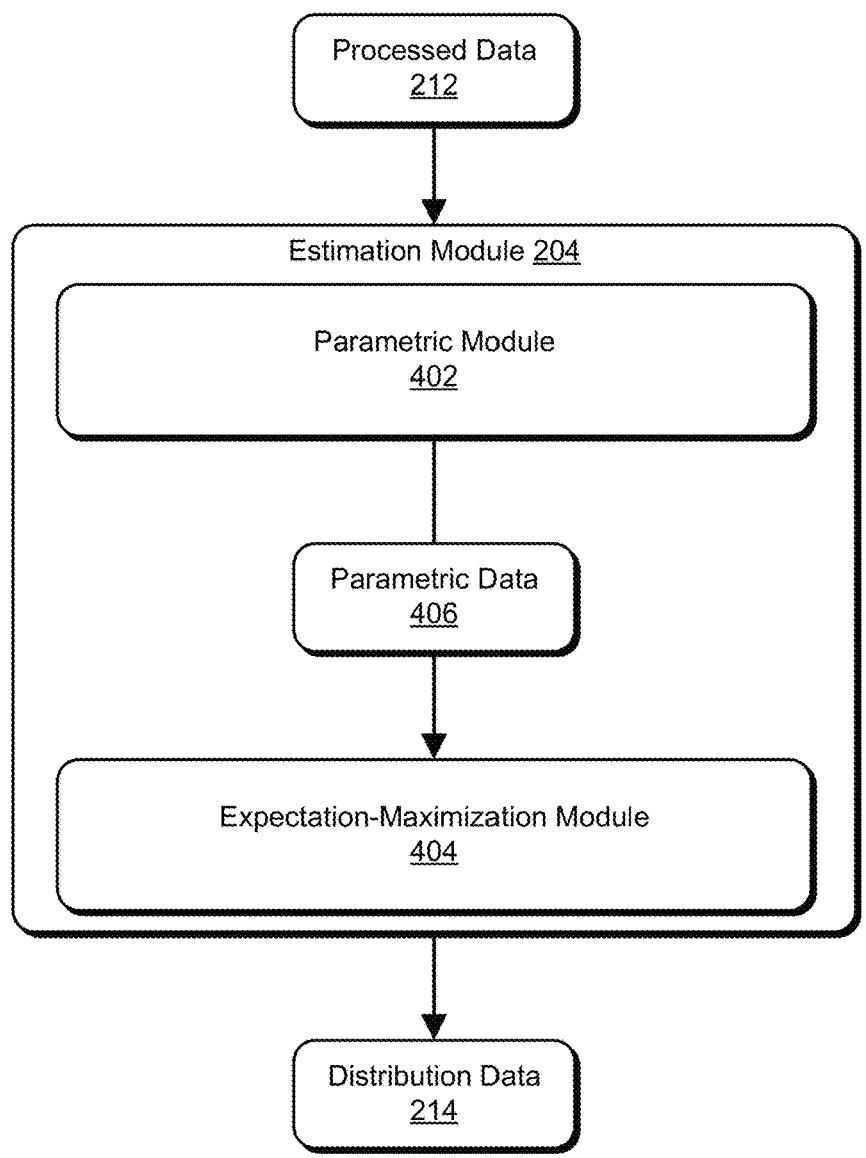
FIG. 4 depicts a system in an example implementation showing operation of an estimation module for estimating distribution parameters and mixture proportions.

The estimation module 204 receives the processed data 214 and processes the processed data 214 to generate distribution data 214. FIG. 4 depicts a system 400 in an example implementation showing operation of an estimation module 204. The estimation module 204 is illustrated to include a parametric module 402 and an expectation-maximization module 404. The parametric module 402 receives the processed data 212 and processes the processed data 212 to generate parametric data 406.

Figure 5:
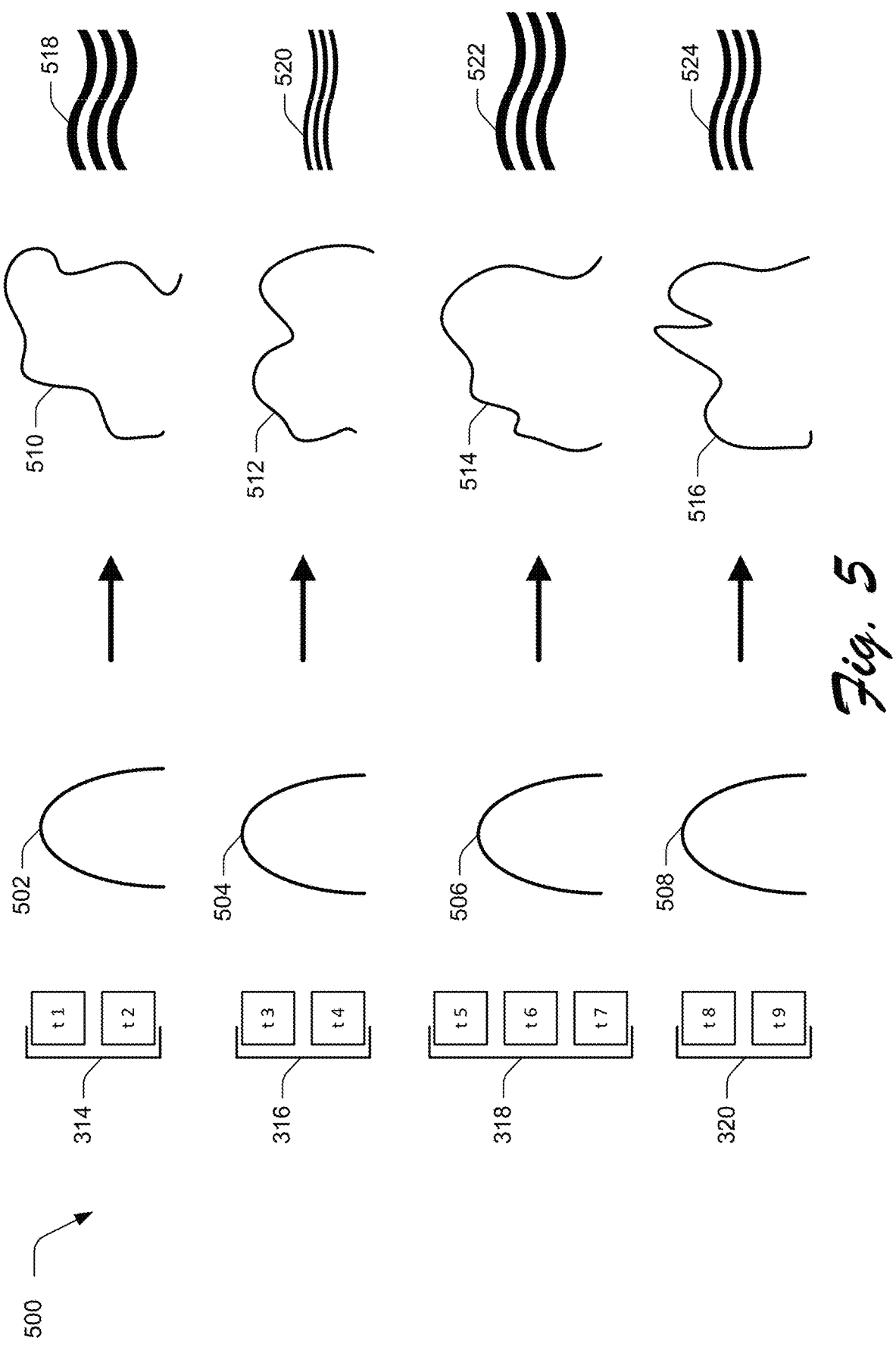
FIG. 5 illustrates a representation of estimated distributions and mixture proportions.

FIG. 5 illustrates a representation 500 of estimated distributions and mixture proportions. As shown, the parametric module 402 processes the processed data 214 to generate parametric models 502-508 for the groups 314-320. For instance, the parametric module 402 generates parametric model 502 for the group 314; parametric model 504 for the group 316; parametric model 506 for the group 318; and parametric model 508 for the group 320. The parametric module 402 generates the parametric data 406 as describing the parametric models 502-508 for the groups 314-320.

With reference to FIG. 4 and FIG. 5, the expectation-maximization module 404 receives the parametric data 406 and processes the parametric data 406 to generate the distribution data 214. To do so in one example, the expectation-maximization module 404 implements an expectation-maximization algorithm and uses the expectation-maximization algorithm to estimate distributions 510-516 and mixing proportions 518-524. As shown, distribution 510 and mixing proportion 518 are estimated for the treatment values t1 and t2 included in the group 314; distribution 512 and mixing proportion 520 are estimated for the treatment values t3 and t4 included in the group 316; distribution 514 and mixing proportion 522 are estimated for the treatment values t5, t6, and t7 included in the group 318; and distribution 514 and mixing proportion 524 are estimated for the treatment values t8 and t9 included in the group 320. The expectation-maximization module 404 generates the distribution data 214 as describing the distributions 510-516 and the mixing proportions 518-524.

Figure 6A:
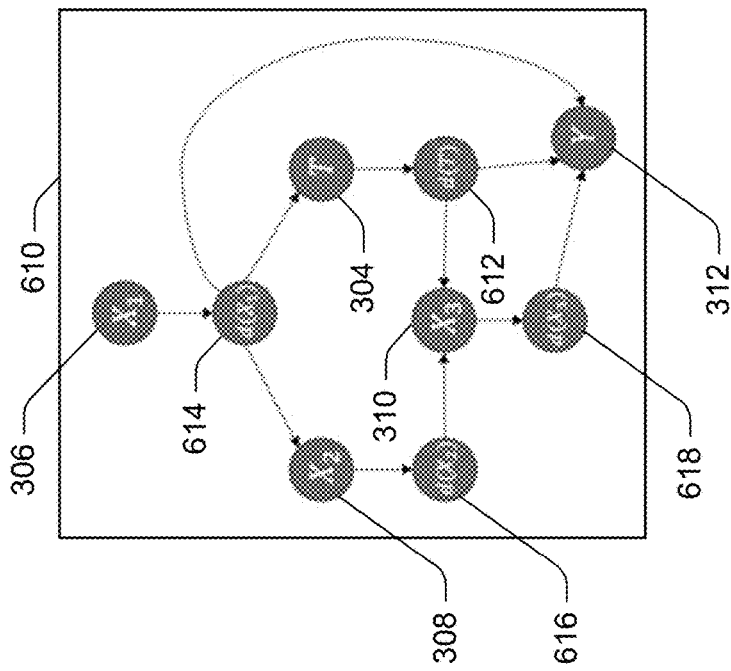
Figure 6A:
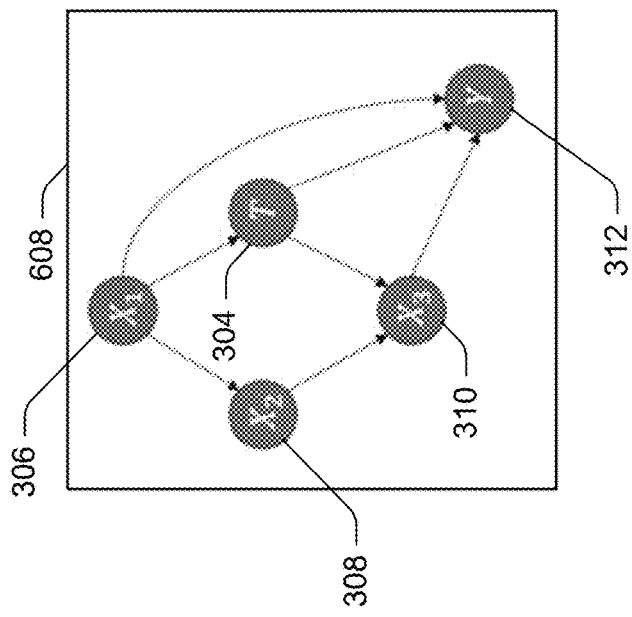
Figure 6B:
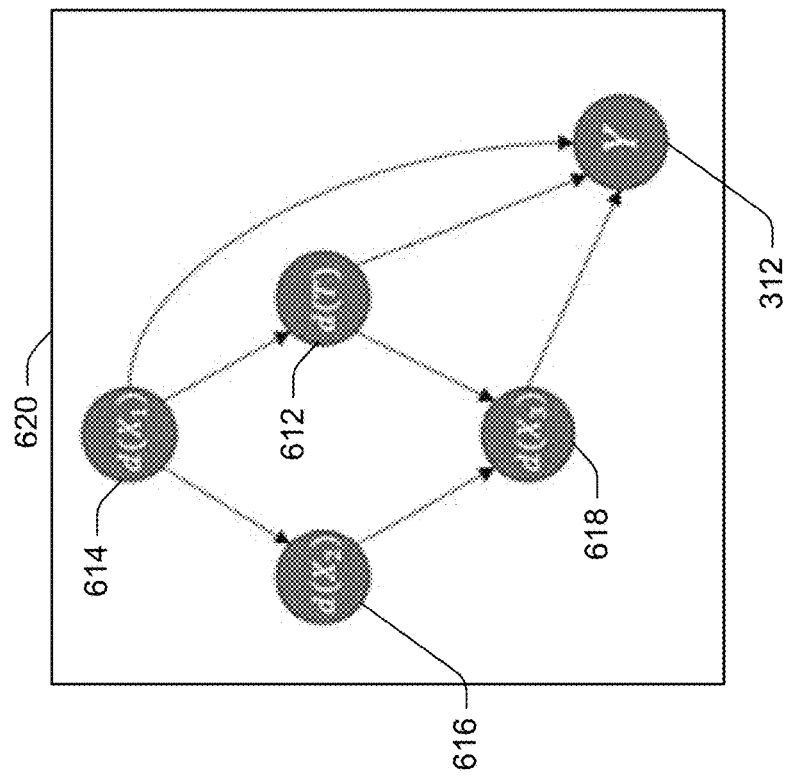
Figure 6D:
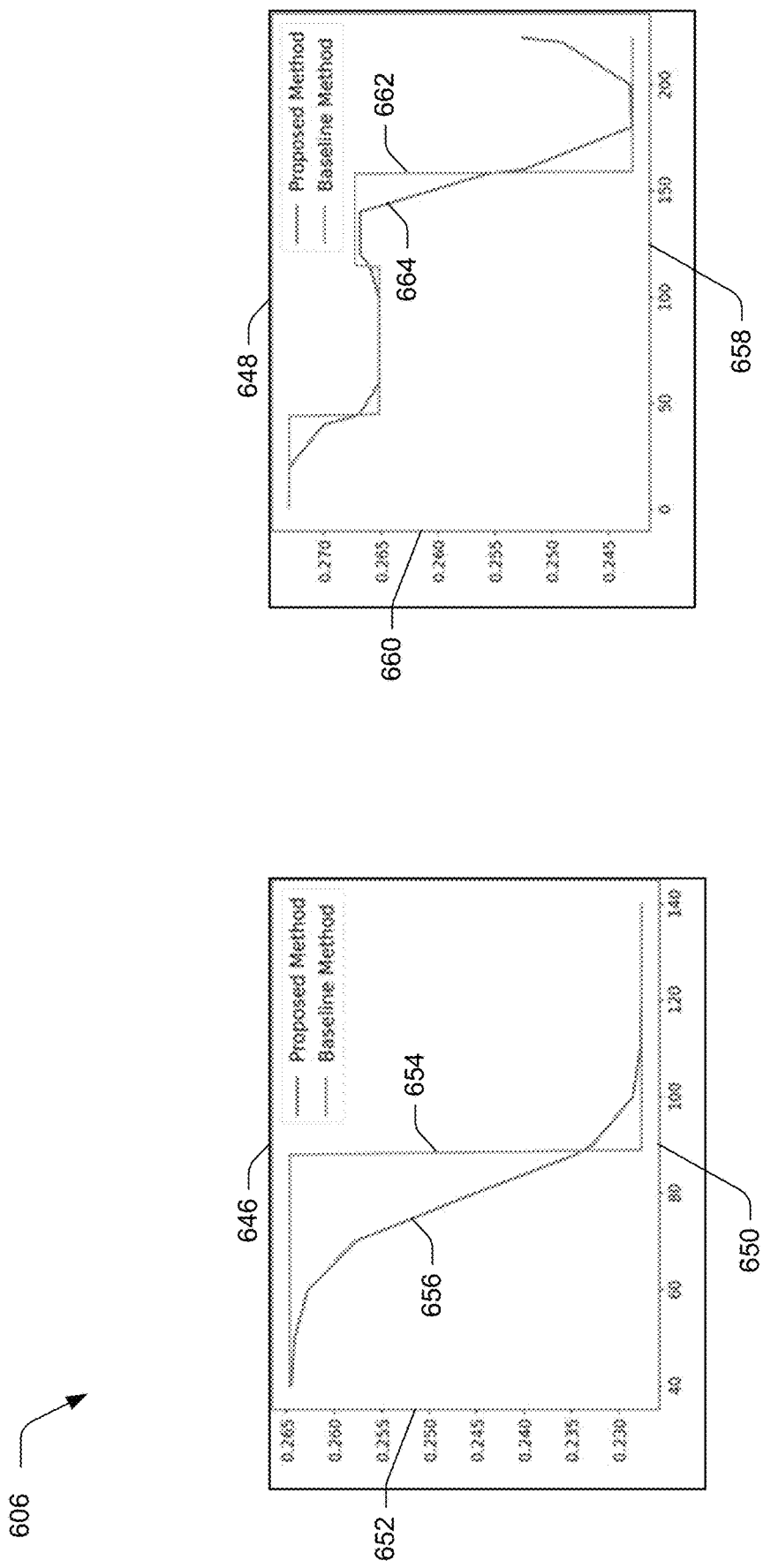

As shown in FIG. 2, the graph module 206 receives the distribution data 214 and processes the distribution data 214 to generate graph data 216. FIGS. 6A, 6B, 6C, and 6D illustrate examples of estimating terminal event likelihood. FIG. 6A illustrates a representation 600 of forming a directed acyclic graph from a known structure of a causal Bayesian network. FIG. 6B illustrates a representation 602 of a formed directed acyclic graph from the known structure of the causal Bayesian network or from performing a Fast Greedy Equivalence Search on the processed data 212. FIG. 6C illustrates a representation 604 of computing estimate components. FIG. 6D illustrates a representation 606 of indications of estimated likelihoods of the terminal event for values of metrics.

With reference to FIG. 6A, an example of a known structure of a causal Bayesian network 608 includes a node for the treatment metric 304, a node for the first covariate metric 306, a node for the second covariate metric 308, a node for the third covariate metric 310, and a node for the terminal event 312. In an example in which conditional probabilities for the known structure of the causal Bayesian network 608 are also known (e.g., probabilities of any node given its parent nodes are known), then likelihoods of the terminal event 312 are directly computable for the treatment values t1-t9. If these conditional probabilities are not known, then the graph module 206 generates a modified structure of the causal Bayesian network 610.

To do so, the graph module 206 assumes that an effect of a relatively high cardinality variable V on its children flows via a relatively low cardinality representation d(V) of the relatively high cardinality variable V. Based on this assumption, the graph module 206 infers new nodes d(V) for the known structure of the causal Bayesian network 608 such that for any child W of V an edge V→W is equivalent to V→d(V)→W. For example, new nodes d(V) are complete mediators of causal effects of V on other variables. The graph module 206 also assumes that given V, the relatively low cardinality representation d(V) of the relatively high cardinality variable V is independent of ancestors of V. For instance, the graph module 206 also assumes that V in an only parent of d(V).

The graph module 206 adds d(V) as nodes 612-618 to the known structure of the causal Bayesian network 608 to generate the modified structure of the causal Bayesian network 610. For example, the graph module 206 adds node d(T) 612 for the node for the treatment metric 304 such that the node d(T) 612 only has the node for the treatment metric 304 as a parent. Similarly, the graph module 206 adds node d(X1) 614 for the node for the first covariate metric 306 such that the node d(X1) 614 only has the node for the first covariate metric 306 as a parent; the graph module 206 adds node d(X2) 616 for the node for the second covariate metric 308 such that the node d(X2) 616 only has the node for the second covariate metric 308 as a parent; and the graph module 206 adds node d(X3) 618 for the node for the third covariate metric 310 such that the node d(X3) 618 only has the node for the third covariate metric 310 as a parent. For example, the node d(T) 612 is representative of the groups 314-320; the node d(X1) 614 is representative of the groups 322-326; the node d(X2) 616 is representative of the groups 328-332; and the node d(X3) 618 is representative of the groups 334-338.

In order to compute causal effects or likelihoods of the terminal event 312, the graph module 206 leverages the modified structure of the causal Bayesian network 610 to compute P(Y|do(T=t)). To do so in one example, the graph module 206 assumes d(T) takes values in a set $\{1, \ldots, k\}$ which is representable as:

$$P(Y|do(T = t)) = \sum_{i=1}^{k} P(Y|do(d(T) = i))P(d(t) = i|T = t)$$

Accordingly, with P(Y|do(d(T)=i)) and P(d(t)=i|T=t) for $i \in \{1, \ldots, k\}$ the graph module 206 computes the likelihoods of the terminal event 312. For the second term:

$$P(d(t) = i|T = t) = \frac{f_i(t)\pi_i}{f(t)} = \frac{f_i(t)\pi_i}{\sum_{j=1}^{k} f_j(t)\pi_j}$$

where: for $j \in \{1, \ldots, k\}$, f represents density $f_{T|d(t)=j}$; $\pi_j$ represents probability P(d(T)=j); and f is a density function for T.

The graph module 206 estimates P(Y|do(d(T)=j)), $f_j$, and $\pi_j$ for all $j \in \{1, \ldots, k\}$ which implies an estimate of P(Y|do(T=t)) for all possible values t of T. For instance, the graph module 206 models V as a mixture of k distributions (e.g., relatively small and fixed constant distributions) and d(V) as a variable capturing an index of a distribution a sample comes from or a hidden variable of the mixture model. In an example, this is representable as:

$$\text{for } i \in \{1, \ldots, k\}: V \sim f_i \text{ if } d(V) = i$$

where: $f_1, \ldots, f_k$ are k distributions on a range of values of V; and $f_i$ is modeled using well-known distributions (e.g., Gaussian) and using techniques such as an expectation-maximization algorithm to learn its parameters and mixing proportions $\pi_i = P(d(V) = i)$.

In order to estimate $f_j$ and $\pi_j$, the graph module 206 processes the distribution data 214 to assume parametric models for $f_i$ and then uses techniques such an expectation-maximization algorithm to recover parameters of $f_j$ and $\pi_j$. For example, when some node V takes a relatively large number of numerical values, the graph module 206 assumes V to be a mixture of k Gaussians with parameters $(\mu_j, \sigma_j)$, $j \in [k]$. In this example, the expectation-maximization algorithm receives data in a column corresponding to V as an input, and then the expectation-maximization algorithm outputs estimates of different parameters $(\mu_j, \sigma_j)$ and mixing proportions $\pi_j$.

In order to estimate $P(Y|do(d(T)=j))$, the graph module 206 generates the graph data 216 as describing a formed directed acyclic graph 620. As shown in FIG. 6B, if the modified structure of the causal Bayesian network 610 is known, then the graph module 206 generates the formed directed acyclic graph 620 by replacing V with d(V) for variables having numbers of values greater than k.

If the modified structure of the causal Bayesian network 610 is not known, then the graph module 206 generates d(V) using the mixture model as previously described which is applied to the observed data 120 to generate columns corresponding to d(V). In this example, the graph module 206 learns the formed directed acyclic graph 620 directly using a causal discovery algorithm such as a Fast Greedy Equivalence Search algorithm. The graph module 206 leverages the formed directed acyclic graph 360 to estimate conditional probability tables and then generates the graph data 216 as describing the formed directed acyclic graph 620 and the conditional probability tables.

As shown in FIG. 2, the inference module 208 receives the graph data 216 describing the formed directed acyclic graph 360 and the conditional probability tables. The inference module 208 also receives the input data 122 describing a user input requesting an estimate of a likelihood of the terminal event 312 for a particular value of the treatment values t1-t9 of the treatment metric 304. For instance, the inference module 208 processes the graph data 216 and/or the input data 122 to generate estimate data 124.

To do so, the inference module 208 performs do calculus and uses the do operator to break edges of the formed directed acyclic graph 620 that are incoming edges for the node d(T) 612. The inference module 208 sets the broken edges equal to j in the conditional probability tables and estimates the likelihood of the terminal event 312 for the particular value of the treatment metric 304 using a probabilistic logic sampling algorithm. The inference module 208 generates the estimate data 124 as describing the likelihood of the terminal event 312 for the particular value of the treatment metric 304.

For example, rather than estimating the likelihood of the terminal event 312 for the particular value of the treatment metric 304 based on whichever one of the groups 314-320 contains the particular value for the treatment metric 304, the inference module 208 considers each of the groups 314-320. As shown in FIG. 6C, the inference module 208 leverages the distributions 510-516 and mixing proportions 518-524 to estimate the likelihood of the terminal event 312 for the particular value of the treatment metric 304. To do so in one example, the inference module 208 determines a density 622 of the distribution 510 of the group 314 at the particular value of the treatment metric 304; a density 624 of the distribution 512 at the particular value of the treatment metric 304; a density 626 of the distribution 514 at the particular value of the treatment metric 304; and a density 628 of the distribution 516 at the particular value of the treatment metric 304.

For example, the inference module 208 also determines a probability 630 of including the particular value of the treatment metric 304 in the group 314 using the mixing proportion 518; a probability 632 of including the particular value of the treatment metric 304 in the group 316 using the mixing proportion 520; a probability 634 of including the particular value of the treatment metric 304 in the group 318 using the mixing proportion 522; and a probability 636 of including the particular value of the treatment metric 304 in the group 320 using the mixing proportion 524. Next, the inference module 208 computes estimate components 638-644 for the groups 314-320. The inference module 208 computes estimate component 638 for the group 314 as a product of the density 622 and the probability 630; estimate component 640 for the group 316 as a product of the density 624 and the probability 632; estimate component 642 for the group 318 as a product of the density 626 and the probability 634; and estimate component 644 for the group 320 as a product of the density 628 and the probability 636.

The inference module 208 combines or sums the estimate components 638-644 as the likelihood of the terminal event 312 for the particular value of the treatment metric 304. The inference module 208 then generates the estimate data 124 as describing the likelihood of the terminal event 312 for the particular value of the treatment metric 304. The display module 210 receives the estimate data 124 and processes the estimate data 124 to generate an indication of the likelihood of the terminal event 312 for the particular value of the treatment metric 310 for display in a user interface. Although described in terms of one particular value of the treatment metric 304, it is to be appreciated that inference module 208 generates the estimate data 124 as describing likelihoods of the terminal event 312 for all values of the treatment metric 304 in some examples. Consider an example in which the input data 122 describes a user input requesting an estimate of a causal effect of the treatment metric 304 on the terminal event 312.

Continuing the previous example, the inference module 208 determines that the treatment value t1 is included in the group 314; however, in this example the inference module 208 considers not only the group 314 but also the other groups 316-320 when estimating a likelihood of the terminal event 312 for the treatment value t1. To do so, the inference module 208 computes a product of a density of the distribution 510 for the group 314 at the treatment value t1 and a probability of including the treatment value t1 in the group 314; a product of a density of the distribution 512 for the group 316 at the treatment value t1 and a probability of including the treatment value t1 in the group 316; a product of a density of the distribution 514 for the group 318 at the treatment value t1 and a probability of including the treatment value t1 in the group 318; and a product of a density of the distribution 516 for the group 320 at the treatment value t1 and a probability of including the treatment value t1 in the group 320. For example, the inference module 208 sums the computed products as the likelihood of the terminal event 312 for the treatment value t1.

The inference module 208 repeats this process for the treatment values t2, t3, t4, t5, t6, t7, t8, t9 and then generates the estimate data 124 as describing likelihoods of the terminal event 312 for treatment values t1-t9. The display module 210 receives the estimate data 124 and processes the estimate data 124 to generate an indication of the estimate of the causal effect of the treatment metric 304 on the terminal event 312 for display in the user interface. Examples of these indications are illustrated in FIG. 6D for different treatment metrics.

As shown, the representation 606 includes an estimated causal effect on the terminal event 312 for a first treatment metric 646 and an estimated causal effect on the terminal event 312 for a second treatment metric 648. The estimated causal effect on the terminal event 312 for the first treatment metric 646 includes first treatment metric values 650 and corresponding probabilities 652. Results of a baseline method 654 are displayed along with results of the described method 656. The baseline method 654 is limited to estimates at group levels for metrics that have a number of possible values that is greater than the threshold k.

For example, if the baseline method 654 was used the estimate of the causal effect of the treatment metric 304 on the terminal event 312, then this estimate would be limited to an estimated likelihood of the terminal event 312 for the groups 314-320. In this example, the estimated likelihood of the terminal event 312 using the baseline method 654 would be a same estimated likelihood for the treatment value t1 and the treatment value t2. Similarly, treatment values t3 and t4 would have a same estimated likelihood; treatment values t5, t6, and t7 would have a same estimated likelihood; and treatment values t8 and t9 would have a same estimated likelihood using the baseline method 654.

As illustrated for the baseline method 654, the first treatment metric values 650 ranging from 40 to about 90 each correspond to approximately a 0.265 probability of the terminal event 312. The first treatment metric values 650 ranging from about 91 to 140 each correspond to approximately a 0.225 probability of the terminal event 312. As shown for the described method 656, the first treatment metric values 650 are no longer limited to the corresponding probabilities 652 of groups of the first treatment metric values 650. Rather, for the described method 656, the first treatment metric values 650 ranging from 40 to 140 have corresponding probabilities 652 ranging from 0.265 to approximately 0.225.

For example, the service system 110 provides analytics support for the client device 112 and other client devices 112 and the interaction data 116 describes interactions between the client device 112 and the other client devices 112 with the service system 110 as part of the analytics support. In this example, the terminal event 312 is a termination by the client device 112 of the analytics support provided by the service system 110. For example, the first treatment metric 646 is project shares and the first treatment metric values 650 are numbers of project shares.

Continuing this example and because the baseline method 654 is limited to the estimating likelihoods for groups, results of the baseline method 654 indicate a same likelihood of the terminal event 312 for numbers of project shares in the range of 40 project shares to about 90 project shares. With respect to the baseline method 654, increasing the number of project shares from 90 to approximately 91 is illustrated to correspond to a roughly 15 percent decrease in likelihood of the terminal event 312. Furthermore, this decreased likelihood of the terminal event 312 does not change for numbers of project shares ranging from approximately 91 to 140. Collectively, this suggests that the baseline method 654 produces results which are likely inaccurate.

However, results of the described method 656 indicate gradually decreasing likelihoods of the terminal event 312 for numbers of project shares in the range of 40 project shares to about 110 project shares. For numbers of project shares above 110, the results of the described method 656 indicate approximately a same likelihood of the terminal event 312 as the results of the baseline method 654 indicate for an increase from about 90 project shares to about 91 project shares. Accordingly, the results of the described method 656 are indicative of a realistic scenario in which a likelihood of the terminal event 312 gradually decreases as a number of project shares increases until reaching some threshold number (e.g., about 110 project shares) above which additional numbers of the project shares have little or no effect on the likelihood of the terminal event 312. Thus, the results of the described method 656 are likely significantly more accurate than the results of the baseline method 654.

The estimated causal effect on the terminal event 312 for the second treatment metric 648 includes second treatment metric values 658 and corresponding probabilities 660. Results of a baseline method 662 are displayed along with results of the described method 664. The baseline method 662 is limited to estimates at group levels for metrics having a number of possible values that is greater than the threshold k.

As illustrated for the baseline method 662, the second treatment metric values 658 ranging from 0 to about 45 each correspond to approximately a 0.274 probability of the terminal event 312. For the baseline method 662, the second treatment metric values 658 ranging from about 46 to about 110 each correspond to about a 0.265 probability of the terminal event 312. As also shown, the second treatment metric values 658 ranging from about 111 to about 160 each correspond to approximately a 0.267 probability of the terminal event 312 and the second treatment metric values 658 ranging from about 161 to about 250 each correspond to roughly a 0.243 probability of the terminal event 312.

Unlike the baseline method 662, the described method 664 is not limited to estimating likelihoods of the terminal event 312 for the groups. As shown for the described method 664, the probabilities 660 range from about 0.274 to about 0.243 for the second treatment metric values 658 ranging between 0 and about 250. For instance, results of the described method 664 are similar to results of the baseline method 662; however, the results of the described method 664 provide more information than the results of the baseline method 662 because the baseline method 662 is limited to estimates for groups of the second treatment metric values 658.

Consider an example in which the terminal event 312 is the termination by the client device 112 of the analytics support provided by the service system 110 and the second treatment metric 648 is unique user identifiers (IDs) and the second treatment metric values 658 are numbers of unique user IDs. In this example, the results of the baseline method 662 indicate a same likelihood of the terminal event 312 for about 46 unique user IDs as for about 110 unique user IDs. The results of the baseline method 662 also indicate that an increase from about 160 unique user IDs to about 161 unique user IDs corresponds to about a 9 percent decrease in the likelihood of the terminal event 312. For instance, roughly a 9 percent change in the likelihood of the terminal event 312 based on less than a 1 percent change in a number of unique user IDs suggests that the results of the baseline method 662 are likely inaccurate.

The results of the described method 664 appear to be more likely to be accurate than the results of the baseline method 662. For example, instead of about a 9 percent decrease in the likelihood of the terminal event 312 based on the addition of one unique user ID presented in the results of the baseline method 662, the results of the described method 664 reflect a similar decrease in the likelihood of the terminal event 312 but this decrease occurs gradually beginning at around 125 unique user IDs and ending at around 175 unique user IDs. The results of the described method 664 are indicative of a realistic scenario in which a likelihood of the terminal event 312 gradually decreases as a number of unique user IDs gradually increases. Accordingly, the results of the described method 664 appear to be more accurate than the results of the baseline method 662 for the second treatment metric 648.

Although the examples are described in relation to estimating a likelihood of the terminal event 312, it is to be appreciated that the described systems are not limited to estimating likelihoods of terminal events. For example, the described systems are usable to estimate an effect of a new drug on recovery from a particular disease. In another example, the described systems are usable to estimate an effect of a set of fonts on website engagement.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 7:
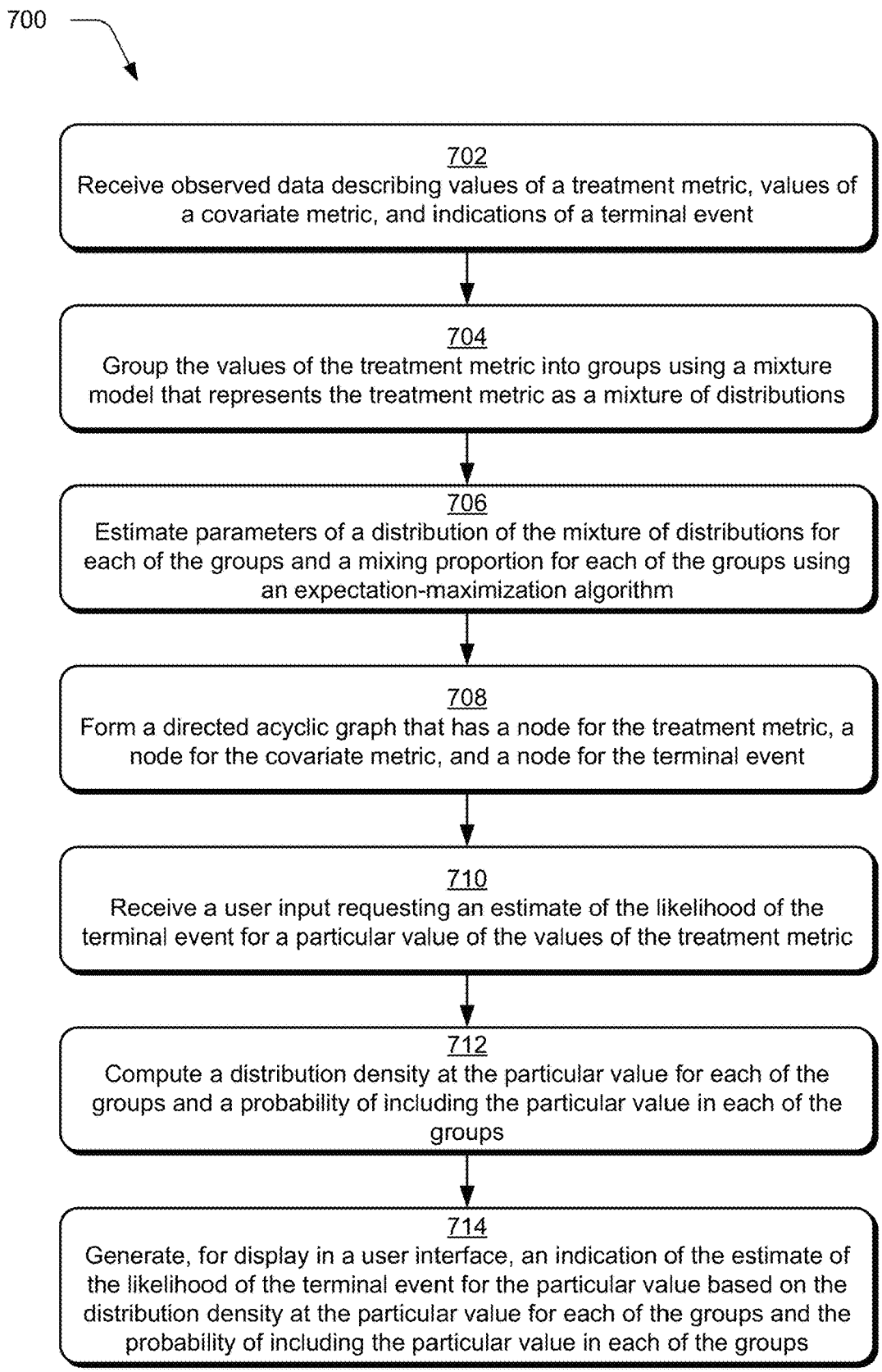
FIG. 7 is a flow diagram depicting a procedure in an example implementation in which a user input is received requesting an estimate of a likelihood of a terminal event for a particular value of values of a treatment metric and an indication of the estimate of the likelihood of the terminal event for the particular value is generated for display in a user interface.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6. FIG. 7 is a flow diagram depicting a procedure 700 in an example implementation in which a user input is received requesting an estimate of a likelihood of a terminal event for a particular value of values of a treatment metric and an indication of the estimate of the likelihood of the terminal event for the particular value is generated for display in a user interface.

Observed data is received describing values of a treatment metric, values of a covariate metric, and indications of a terminal event (block 702). The computing device 102 implements the termination module 108 to receive the observed data in one example. The values of the treatment metric are grouped into groups using a mixture model that represents the treatment metric as a mixture of distributions (block 704). In one example, the termination module 108 groups the values of the treatment metric into the groups.

Parameters of a distribution of the mixture of distributions for each of the groups are estimated and a mixing proportion for each of the groups is estimated using an expectation-maximization algorithm (block 706). For example, the termination module 108 estimates the parameters of the distribution and the mixing proportion for each of the groups. A directed acyclic graph is formed that has a node for the treatment metric, a node for the covariate metric, and a node for the terminal event (block 708). The computing device 102 implements the termination module 108 to form the directed acyclic graph in an example.

A user input is received requesting an estimate of the likelihood of the terminal event for a particular value of the values of the treatment metric (block 710). In one example, the termination module 108 receives the user input. A distribution density at the particular value for each for each of the groups is computed and a probability of including the particular value in each of the groups is computed (block 712). For example, the termination module 108 computes the distribution density at the particular value for each of the groups and the probability of including the particular value in each of the groups. An indication is generated for display in a user interface of the estimate of the likelihood of the terminal event for the particular value based on the distribution density at the particular value for each of the groups and a probability of including the particular value in each of the groups (block 704). The computing device 102 implements the termination module 108 to generate the indication for display in the user interface in some examples.

Figure 8:
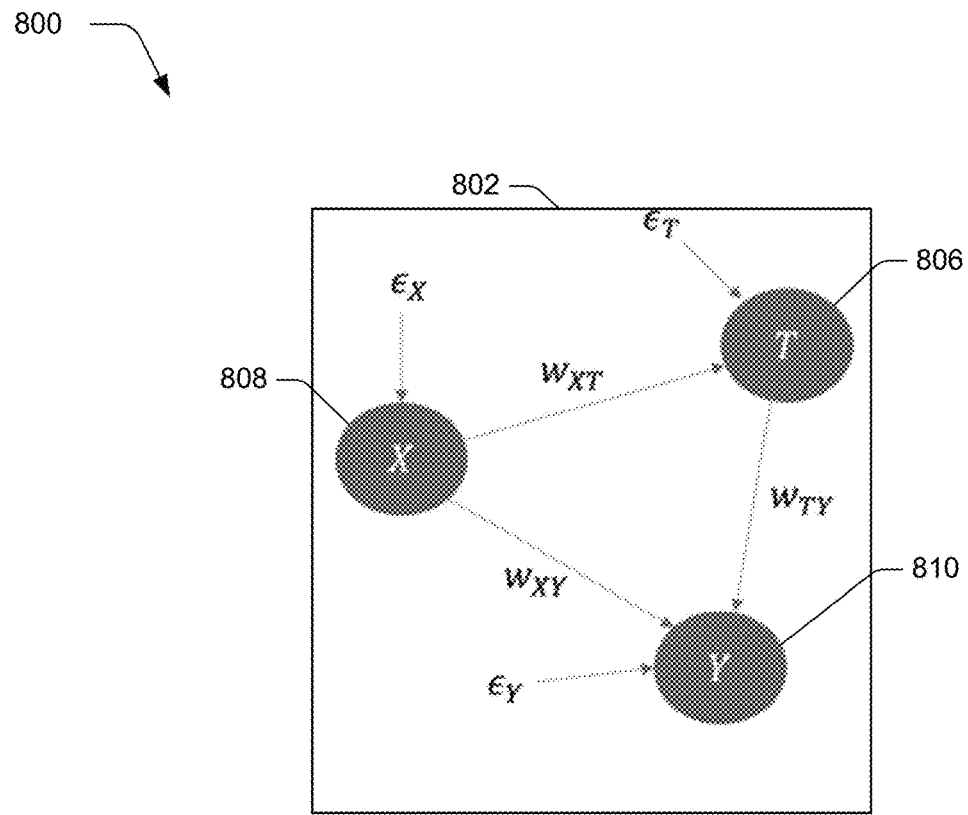
FIG. 8 illustrates an example in which systems for estimating terminal event likelihood are validated on a synthetic dataset.
Figure 8:
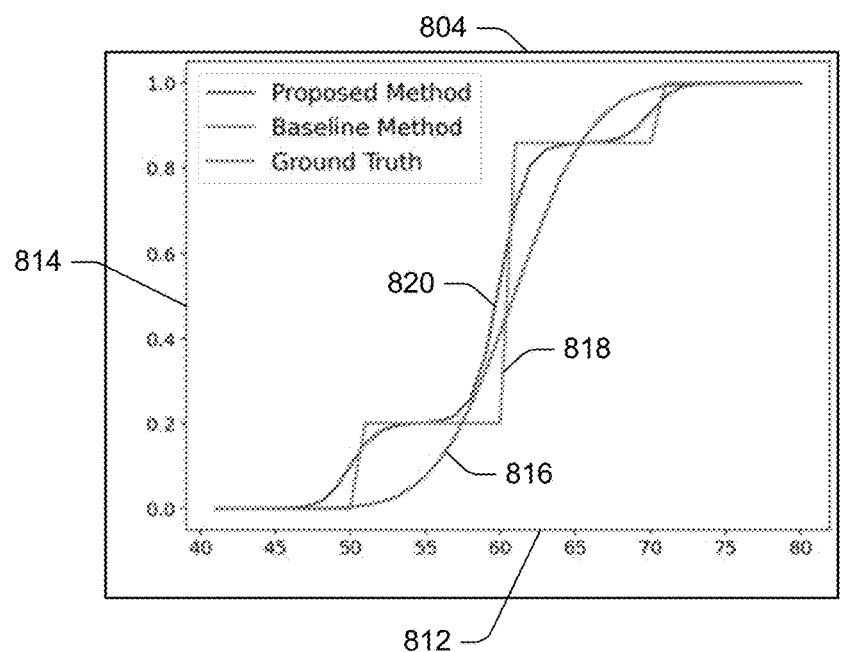

FIG. 8 illustrates an example 800 in which systems for estimating terminal event likelihood are validated on a synthetic dataset. The example 800 includes a directed acyclic graph 802 and a result summary 804. For example, the synthetic dataset is generated using a Structural Equation Model and includes a treatment variable T, a covariate X, and an outcome variable Y. In an example, this is representable as:

$$X:=\varepsilon_X; T:=\omega_{XT}X+\varepsilon_T; T:=\text{Bernoulli}(\sigma(\omega_{XY}X+\omega_{TY}T+\varepsilon_y))$$

where: $\varepsilon_X$, $\varepsilon_T$, and $\varepsilon_Y$ are independent standard Gaussian variables representing exogenous noise influencing X, T, and Y, respectively; variables X and T are continuous with a relatively large range of values; variable Y is binary; and $\omega_{XT}$, $\omega_{XY}$, and $\omega_{TY}$ represent model weights and are randomly chosen from a uniform distribution between 0 and 1.

As shown, the directed acyclic graph 802 includes a node 806 for T; a node 808 for X, and a node 810 for Y. The result summary 804 includes metric values 812 and corresponding probabilities 814 for a ground truth 816, a baseline method 818, and the described method 820. The termination module 108 generates 50000 samples using the directed acyclic graph 802 and uses the samples to estimate a causal effect of T on Y as P(Y=1|do(T=t)). Since the dataset is synthetic, the ground truth 816 is estimated using the do operator and breaking an edge of the directed acyclic graph 802 from X to T, setting T to t, and estimating P(Y=1). The termination module 108 groups the metric values 812 into 10 equally sized groups. To ensure a fair comparison, a same value for d(T) and d(X) is used with k=10. Since X and T are continuous, $f_i$ is modeled as Gaussians $N(\mu_i, \sigma_i)$ and a required gaussian mixture model is learned using an expectation-maximization algorithm which provides estimates of $\mu_i, \sigma_i, \pi_i, i \in \{1, \ldots, k\}$.

As illustrated in the result summary 804, estimates generated using the described method 820 are closer to the ground truth 816 than estimates generated using the baseline method 818. This is because the baseline method 818 is limited to estimates for groups of the metric values 812 and the described method 820 is not limited in this manner A Mean Squared Error (MSE) between the results of the described method 820 and the ground truth 816 is $9.3e^{-3}$ and a MSE between the results of the baseline method 818 and the ground truth 816 is $15.4e^{-3}$. Accordingly, the described method 820 demonstrates significant improvement relative to the baseline method 818 on the synthetic dataset.

Example System and Device

FIG. 9 illustrates an example system 900 that includes an example computing device that is representative of one or more computing systems and/or devices that are usable to implement the various techniques described herein. This is illustrated through inclusion of the termination module 108. The computing device 902 includes, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that are configured as processors, functional blocks, and so forth. This includes example implementations in hardware as an application specific integrated circuit or other logic device formed using one or more semiconductors. The hardware elements 910 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 906 is illustrated as including memory/storage 912. The memory/storage 912 represents memory/storage capacity associated with one or more computer-readable media. In one example, the memory/storage 912 includes volatile media (such as random access memory (RAM)) and/or nonvolatile media (such as read only memory (ROM), Flash memory, optical disks, magnetic disks, and so forth). In another example, the memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 910. For example, the computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supportable by various configurations of the computing device 902 and are not limited to the specific examples of the techniques described herein. This functionality is also implementable entirely or partially through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. For example, the resources 918 include applications and/or data that are utilized while computer processing is executed on servers that are remote from the computing device 902. In some examples, the resources 918 also include services provided over the Internet and/or through a subscriber network, such as a cellular or Wi-Fi network.

The platform 916 abstracts the resources 918 and functions to connect the computing device 902 with other computing devices. In some examples, the platform 916 also serves to abstract scaling of resources to provide a corresponding level of scale to encountered demand for the resources that are implemented via the platform. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

CONCLUSION

Although implementations of systems for estimating terminal event likelihood have been described in language specific to structural features and/or methods, it is to be understood that the appended claims are not necessarily limited to the specific features or methods described. Rather, the specific features and methods are disclosed as example implementations of systems for estimating terminal event likelihood, and other equivalent features and methods are intended to be within the scope of the appended claims. Further, various different examples are described and it is to be appreciated that each described example is implementable independently or in connection with one or more other described examples.

What is claimed is:

1. A method implemented by a computing device of a plurality of computing devices controlling network system access of a network environment, the method comprising:
    receiving, by a pre-processing module, observed data describing values of a treatment metric, values of a covariate metric, and indications of a terminal event involving service cancellation of the network system access to an account controlled by a particular computing device of the plurality of computing devices of the network environment;
    grouping, by the pre-processing module, the values of the treatment metric into groups using a mixture model that represents the treatment metric as a mixture of distributions;
    estimating, by an estimation module, parameters of a distribution of the mixture of distributions for each of the groups using an expectation-maximization algorithm;
    estimating, by the estimation module, a mixing proportion for each of the groups using the expectation-maximization algorithm;
    forming, by a graph module, a directed acyclic graph that has a node for the treatment metric, a node for the covariate metric, and a node for the terminal event;
    receiving, by an inference module, a user input requesting an estimate of a likelihood of the terminal event for a particular value of the values of the treatment metric;
    computing, by the inference module, a distribution density at the particular value for each of the groups using the directed acyclic graph and the parameters of the distribution of the mixture of distributions for each of the groups;
    computing, by the inference module, a probability of including the particular value in each of the groups using the directed acyclic graph and the mixing proportion for each of the groups; and
    generating, by the inference module for display in a user interface by a display device, an indication of the estimate of the likelihood of the terminal event involving the service cancellation for the particular value based on the distribution density at the particular value for each of the groups and the probability of including the particular value in each of the groups.

2. The method as described in claim 1, wherein the directed acyclic graph is formed using a causal discovery algorithm.

3. The method as described in claim 1, further comprising grouping the values of the covariate metric into additional groups using an additional mixture model wherein a number of the additional groups is equal to a number of the groups.

4. The method as described in claim 1, further comprising estimating a conditional probability table for each node of the directed acyclic graph.

5. The method as described in claim 1, further comprising computing an estimate component for each of the groups as a product of the distribution density at the particular value and the probability of including the particular value in each of the groups.

6. The method as described in claim 5, further comprising combining the estimate components as the estimate of the likelihood of the terminal event for the particular value.

7. The method as described in claim 1, wherein grouping the values of the treatment metric into the groups includes performing k-means clustering.

8. The method as described in claim 1, wherein the mixture model is a Gaussian mixture model.

9. The method as described in claim 1, further comprising performing probabilistic logic sampling as part of generating the indication of the estimate of the likelihood of the terminal event for the particular value.

10. A system including a plurality of computing devices controlling network system access of a network environment, the system comprising:
a pre-processing module implemented at least partially in hardware of a computing device to:
receive observed data describing values of a treatment metric, values of a covariate metric, and indications of a terminal event involving service cancellation of the network system access to an account controlled by a particular computing device of the plurality of computing devices of the network environment;
determine that a number of the values of the treatment metric is greater than a threshold number; and
group the values of the treatment metric into groups using a mixture model that represents the treatment metric as a mixture of distributions, a number of the groups is less than the threshold number;
an estimation module implemented at least partially in the hardware of the computing device to:
estimate parameters of a distribution of the mixture of distributions for each of the groups using an expectation-maximization algorithm; and
estimate a mixing proportion for each of the groups using the expectation-maximization algorithm;
a graph module implemented at least partially in the hardware of the computing device to form a directed acyclic graph that has a node for the treatment metric, a node for the covariate metric, and a node for the terminal event; and
an inference module implemented at least partially in the hardware of the computing device to:
receive a user input requesting an estimate of a likelihood of the terminal event for a particular value of the values of the treatment metric;
compute a distribution density at the particular value for each of the groups using the directed acyclic graph and the parameters of the distribution of the mixture of distributions for each of the groups;
compute a probability of including the particular value in each of the groups using the directed acyclic graph and the mixing proportion for each of the groups; and
generate, for display in a user interface on a display device, an indication of the estimate of the likelihood of the terminal event involving the service cancellation for the particular value based on the directed acyclic graph, distributions associated with each of the groups, and probabilities of including the particular value in each of the groups.

11. The system as described in claim 10, wherein the pre-processing module is further implemented to group the values of the covariate metric into additional groups using an additional mixture module, a number of the additional groups is equal to the number of the groups.

12. The system as described in claim 10, wherein the directed acyclic graph is formed using a causal discovery algorithm.

13. The system as described in claim 10, wherein the inference module is further implemented compute an estimate component for each of the groups as a product of the distribution density at the particular value and the probability of including the particular value in each of the groups.

14. The system as described in claim 13, wherein the inference module is further implemented to combine the estimate components as the estimate of the likelihood of the terminal event for the particular value.

15. The system as described in claim 10, wherein the inference module is further implemented to perform probabilistic logic sampling as part of generating the indication of the estimate of the likelihood of the terminal event for the particular value.

16. One or more computer-readable storage media comprising instructions stored thereon that, responsive to execution by a computing device of a plurality of computing devices controlling network system access of a network environment, causes the computing device to perform operations including:
receiving observed data describing values of a treatment metric, values of a covariate metric, and indications of a terminal event involving service cancellation of the network system access to an account controlled by a particular computing device of the plurality of computing devices of the network environment;
determining that a number of the values of the treatment metric is greater than a threshold number;
grouping the values of the treatment metric into groups using a mixture model that represents the treatment metric as a mixture of distributions, a number of the groups is less than the threshold number;
estimating parameters of a distribution of the mixture of distributions for each of the groups using an expectation-maximization algorithm;
estimating a mixing proportion for each of the groups using the expectation-maximization algorithm;
forming a directed acyclic graph that has a node for the treatment metric, a node for the covariate metric, and a node for the terminal event;
receiving a user input requesting an estimate of a likelihood of the terminal event for a particular value of the values of the treatment metric;
computing a distribution density at the particular value for each of the groups using the directed acyclic graph and the parameters of the distribution of the mixture of distributions for each of the groups;
computing a probability of including the particular value in each of the groups using the directed acyclic graph and the mixing proportion for each of the groups; and
generating, for display in a user interface on a display device, an indication of the estimate of the likelihood of the terminal event involving the service cancellation for the particular value based on the distribution density at the particular value for each of the groups and the probability of including the particular value in each of the groups.

17. The one or more computer-readable storage media as described in claim 16, wherein the operations further include computing an estimate component for each of the groups as a product of the distribution density at the particular value and the probability of including the particular value in each of the groups.

18. The one or more computer-readable storage media as described in claim 17, wherein the operations further include combining the estimate components as the estimate of the likelihood of the terminal event for the particular value.

19. The one or more computer-readable storage media as described in claim 16, wherein the directed acyclic graph is formed using a causal discovery algorithm.

20. The one or more computer-readable storage media as described in claim 16, wherein grouping the values of the treatment metric into the groups includes performing k-means clustering.

\* \* \* \* \*